US009223937B2

(12) United States Patent
Flowers et al.

(10) Patent No.: US 9,223,937 B2
(45) Date of Patent: Dec. 29, 2015

(54) METHOD AND APPARATUS FOR EXTENDING AN AUTHENTICATION TIMEOUT PERIOD

(71) Applicant: Motorola Mobility LLC, Libertyville, IL (US)

(72) Inventors: Christian L Flowers, Chicago, IL (US); Michael E Gunn, Barrington, IL (US); Jarrett K Simerson, St. Charles, IL (US); Andrew K Wells, Lindenhurst, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 310 days.

(21) Appl. No.: 14/029,014

(22) Filed: Sep. 17, 2013

(65) Prior Publication Data
US 2015/0082421 A1    Mar. 19, 2015

(51) Int. Cl.
| G06F 1/32 | (2006.01) |
| G06F 21/00 | (2013.01) |
| G06F 3/01 | (2006.01) |
| G06F 21/88 | (2013.01) |
| H04W 52/02 | (2009.01) |
| G06F 21/81 | (2013.01) |

(52) U.S. Cl.
CPC .............. *G06F 21/00* (2013.01); *G06F 1/3293* (2013.01); *G06F 3/01* (2013.01); *G06F 21/81* (2013.01); *G06F 21/88* (2013.01); *H04W 52/02* (2013.01)

(58) Field of Classification Search
None
See application file for complete search history.

(56) References Cited

U.S. PATENT DOCUMENTS

| 7,378,939 | B2 | 5/2008 | Sengupta et al. | |
| 8,396,452 | B1 | 3/2013 | Matsuoka | |
| 2003/0074590 | A1* | 4/2003 | Fogle et al. | ........... G06F 1/3203 713/320 |
| 2011/0195665 | A1 | 8/2011 | Friedlaender | |
| 2012/0046012 | A1 | 2/2012 | Forutanpour et al. | |
| 2012/0079586 | A1 | 3/2012 | Brown et al. | |
| 2012/0100895 | A1 | 4/2012 | Priyantha et al. | |
| 2012/0254878 | A1 | 10/2012 | Nachman et al. | |
| 2012/0280917 | A1 | 11/2012 | Toksvig et al. | |
| 2014/0375549 | A1* | 12/2014 | Basavaraja | ........... G06F 1/3203 345/156 |

OTHER PUBLICATIONS

International Search Report and Written Opinion for International Application No. PCT/US2014/054471, mailed Dec. 1, 2014, 10 pages.
Zenconsult, "The Security Timer Reset Permission", http://chirashi.zenconsult.net/2009/11/the-security-timer-reset-permission/, Sep. 16, 2013, 5 pages.

* cited by examiner

*Primary Examiner* — Paul Yanchus, III
(74) *Attorney, Agent, or Firm* — Shumaker & Sieffert, P.A.

(57) ABSTRACT

A method and apparatus for extending an authentication timeout period for an electronic device includes a primary processor of the electronic device initiating an authentication timeout period at a timeout initiation time and putting the primary processor into a sleep mode. The method also includes awakening the primary processor from the sleep mode at an expiration time, upon expiration of the authentication timeout period, and determining whether an authentication timeout extending input was detected by an adjunct processor of the electronic device at an input detection time that occurred during the authentication timeout period. The method further includes extending the authentication timeout period to expire at an extended expiration time, which is based on the input detection time, when the authentication timeout extending input was detected by the adjunct processor or locking the electronic device when the authentication timeout extending input was not detected by the adjunct processor.

20 Claims, 5 Drawing Sheets

METHOD AND APPARATUS FOR EXTENDING AN AUTHENTICATION TIMEOUT PERIOD

FIELD OF THE DISCLOSURE

The present disclosure relates generally to locking an electronic device and more particularly to managing an authentication timeout period for locking an electronic device.

BACKGROUND

A sleep mode for an electronic device allows the device to conserve power, and therefore battery life, without powering off. Contrasted against a normal operating mode for the device, the sleep mode consumes less power but also limits both the operations the device can perform and the user interactions the device will recognize. The sleep mode and the normal operating mode represent opposite sides of a balance between efficiency and functionality.

A balancing of benefits also exists between a locked and an unlocked state for a device. The locked state, which represents greater security, is typically imposed after a period of inactivity (an authorization timeout period) and requires a user to authenticate himself by providing a password or biometric data, for example, before access to the device can be regained. Devices used for more sensitive applications are usually associated with more stringent security measures. Users, however, often find authentication annoying and would rather limit the number of times they must provide passwords, pins, swipe patterns, finger prints, facial scans, or other forms of validation.

While the balance between efficiency and functionality can be conditioned on available power and the balance between security and convenience can be conditioned on a frequency of user interactions, conditions for locking a device while the device is in a sleep mode are lacking.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
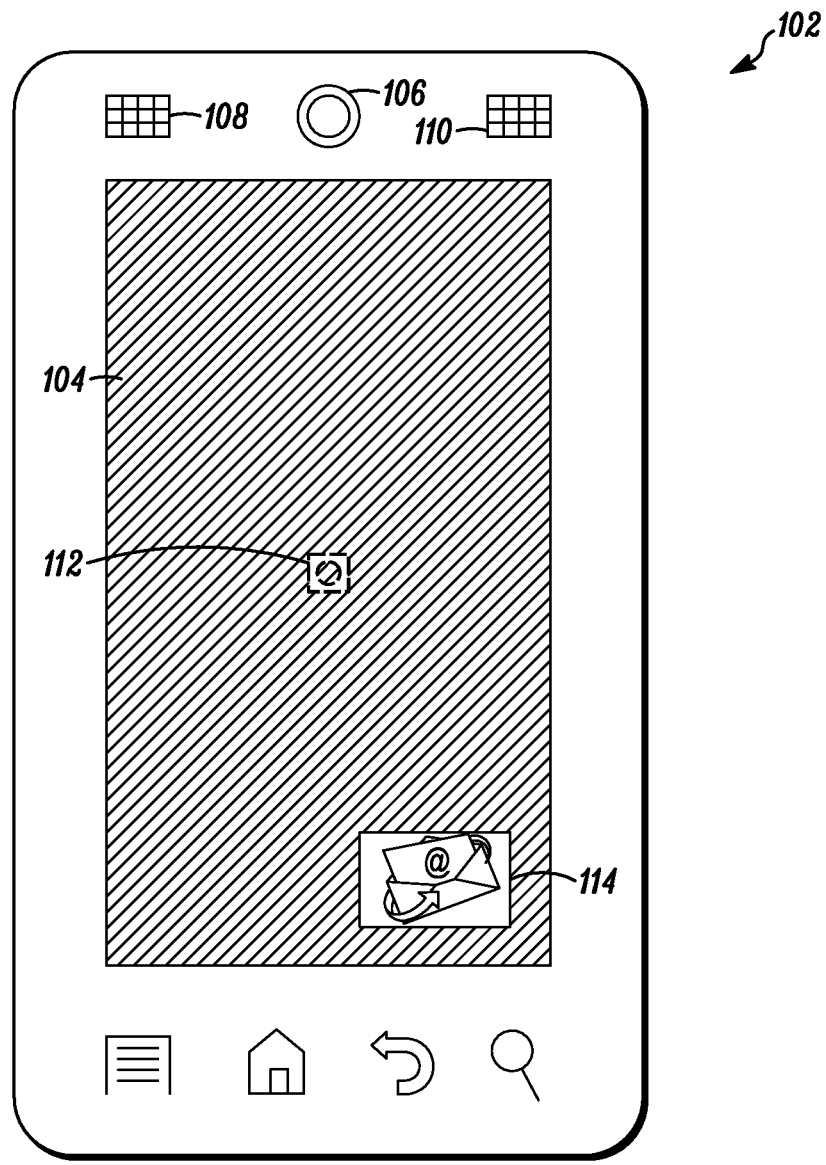
FIG. 1 is a schematic diagram of an electronic device in accordance with some embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for extending an authentication timeout period associated with locking an electronic device. More specifically, the method and apparatus allow the authentication timeout period to be extended based on interactions that take place with the device while the device is in a sleep mode. In accordance with the teachings herein, a method performed by a primary processor of an electronic device for extending an authentication timeout period for the electronic device includes initiating an authentication timeout period at a timeout initiation time and putting the primary processor into a sleep mode. The method also includes awakening the primary processor from the sleep mode at an expiration time, upon expiration of the authentication timeout period, and determining whether an authentication timeout extending input was detected by an adjunct processor of the electronic device at an input detection time that occurred during the authentication timeout period. The method further includes extending the authentication timeout period to expire at an extended expiration time, which is based on the input detection time, when the authentication timeout extending input was detected by the adjunct processor or locking the electronic device when the authentication timeout extending input was not detected by the adjunct processor.

Also in accordance with the teachings herein is an electronic device configured to extend an authentication timeout period for the electronic device. The electronic device includes an adjunct processor configured to detect, while a primary processor is in a sleep mode, an authentication timeout extending input occurring at an input detection time during an authentication timeout period initiated at a timeout initiation time. The electronic device further includes the primary processor which is coupled to the adjunct processor. The primary processor is configured to awaken from the sleep mode upon expiration of the authentication timeout period at an expiration time and determine that the authentication timeout extending input was detected by the adjunct processor during the authentication timeout period. The primary processor is also configured to extend the authentication timeout period to expire at an extended expiration time, which is based on the input detection time.

Referring now to the drawings, and in particular FIG. 1, an electronic device (also referred to herein simply as a "device") implementing embodiments in accordance with the present teachings is shown and indicated generally at 102. Specifically, device 102 represents a smartphone that is shown to include: a touchscreen 104, a camera 106, microphones 108, 110 (e.g., left 108 and right 110 stereo microphones), and a touch sensor 112 on the backside of the device 102. Also shown, is a user notification icon 114 on the touchscreen 104.

While a smartphone is shown at 102, no such restriction is intended or implied as to the type of device to which these teachings may be applied. Other suitable devices include, but are not limited to: personal digital assistants (PDAs); portable media players (e.g., MP3 players); personal computing devices, such as tablets; and wearable electronic devices, such as devices worn with a wristband. For purposes of these teachings, a device can be any electronic apparatus that is capable of a sleep mode and user authentication.

A sleep mode, as defined herein, indicates an operational state assumed by a device to conserve power over a normal operating state for the device. As the device enters a sleep mode, the device powers down but does not power off. In a sleep mode, for example, the device suspends some operations and/or cuts power to some of its hardware components as random access memory (RAM) for the device receives just enough power to maintain the data needed to resume normal operations. If the power and/or operation of a hardware element, such as a processing element, within the device 102 is reduced or suspended during a sleep mode for the device 102, then that hardware element is also referred to herein as being in a sleep mode.

User authentication is a process performed by a device, while it is in a locked state, to verify the identity or privileges of a potential user of the device before allowing the user to gain access to the device. User authentication is the implementation of a control policy that excludes access by unauthorized individuals. A locked state for a device, as used herein, is a state for which the device performs user authentication before allowing the authenticated user full or partial access to the device.

Figure 2:
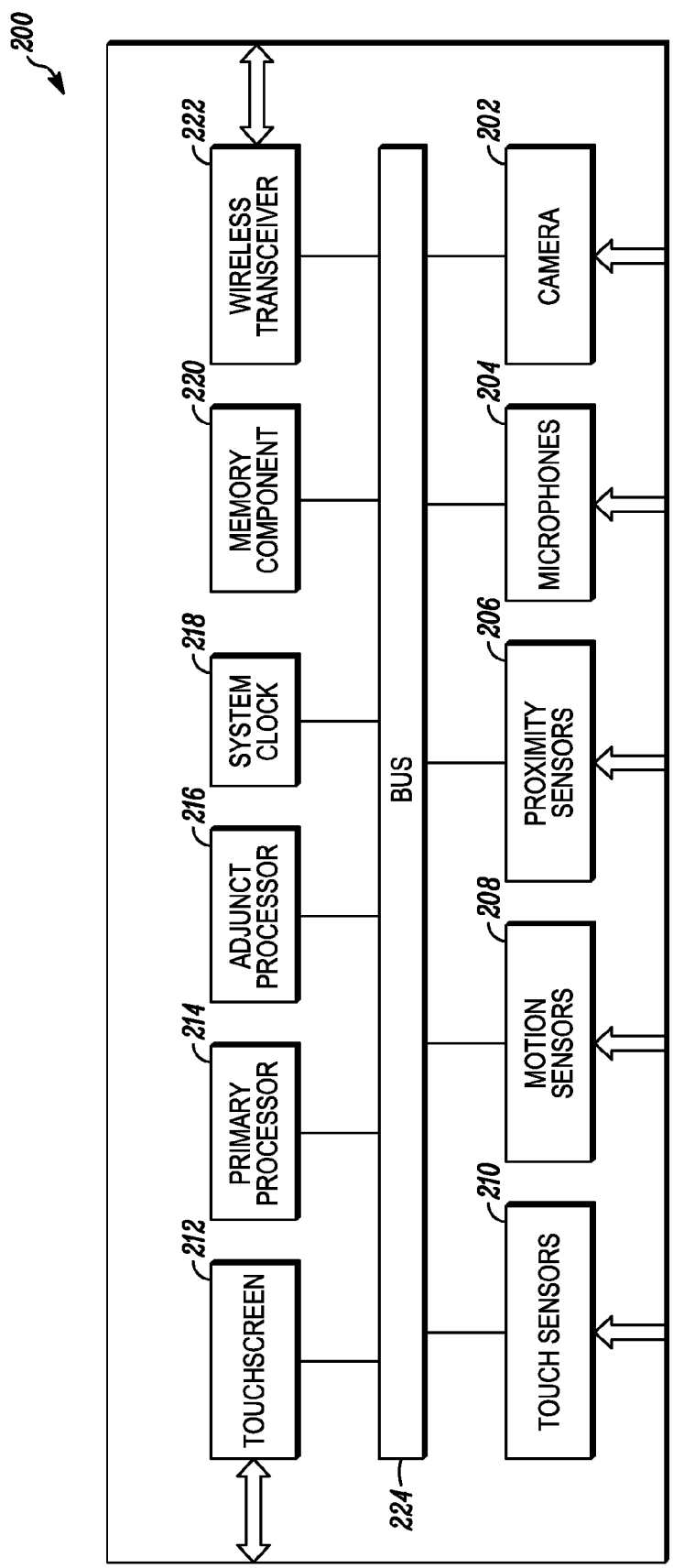
FIG. 2 is a block diagram of an electronic device configured for implementing embodiments in accordance with the present teachings.

Referring to FIG. 2, a block diagram for a device in accordance with embodiments of the present teachings is shown and indicated generally at 200. For one embodiment, the block diagram 200 represents the device 102. Specifically, the block diagram 200 shows: a camera 202, microphones 204, proximity sensors 206, motion sensors 208, touch sensors 210, a touchscreen 212, a primary processor 214, an adjunct processor 216, a system clock 218, a memory component 220, and a wireless transceiver 222, all operationally interconnected or coupled by a bus 224.

A limited number of device elements 202-224 are shown at 200 for ease of illustration, but other embodiments may include a lesser or greater number of such elements in a device, such as device 102. Moreover, other elements needed for a commercial embodiment of a device that incorporates the elements shown at 200 are omitted from FIG. 2 for clarity in describing the enclosed embodiments. Further, the bus 224 is an abstraction of one or more communication systems that transfer data and/or control signals between the device elements 202-222. For embodiments where the element 224 represents multiple busses (i.e., multiple communication systems), some of the device elements 202-222 might be coupled to a single bus while others might be coupled to multiple busses, in different combinations, to perform their functionality as described herein.

We now turn to a brief description of the elements within the block diagram 200. In general, the primary processor 214 and the adjunct processor 216 are configured with functionality in accordance with embodiments of the present disclosure as described in detail below with respect to the remaining figures. "Adapted," "operative," "capable" or "configured," as used herein, means that the indicated elements are implemented using one or more hardware devices such as one or more operatively coupled processing cores, memory devices, and interfaces, which may or may not be programmed with software and/or firmware as the means for the indicated elements to implement their desired functionality. Such functionality is supported by the other hardware shown in FIG. 2, including the device elements 202-212 and 218-224.

Continuing with the brief description of the device elements shown at 200, as included within the device 102, the processors 214 and 216 include arithmetic logic and registers necessary to perform the digital processing required by the device 102 to process data and operate in a manner consistent with the embodiments described herein. In particular, the primary processor 214 provides main or core processing capabilities within the electronic device 102 and, in an embodiment, serves as an application processor. For example, the primary processor 214 is implemented as a system-on-chip (SoC) that supports word processing applications, email and text messaging applications, video and other image-related and/or multimedia applications, etc., executable on the electronic device 102. For an embodiment, the primary processor 214 also locks the device 102 upon the expiration of an authentication timeout period (ATP) and unlocks the device upon successfully completing a user authentication procedure.

The ATP, as defined herein, is a time period, initiated by the primary processor 214, that precedes the primary processor 214 locking the device 102. In an embodiment, the primary processor 214 locks the device 102 at the expiration of the ATP if no detectable user interaction occurs with the device 102 during the ATP. In a further embodiment, the primary processor postpones locking the device 102 by extending the ATP if one or more of a specific set of events or interactions with the device 102 does occur during the ATP.

The adjunct processor 216 is a separate processor that, in an embodiment, handles peripheral or supportive processes for the primary processor 214. For example, the adjunct processor 216 monitors tactile input onto the touchscreen 104 in order to perform its functionality according to the present teachings. In a particular embodiment, the adjunct processor 216 supports processes that require less processing power than those performed by the primary processor 214, allowing for continued operation of the device 102 while the primary processor is in a sleep mode.

In an embodiment, the primary processor 214 and the adjunct processor 216 are operationally coupled by the bus 224 that includes a communications link supporting one or more standard or proprietary protocols for communicating data, control signals, and/or clock signals between the processors 214 and 216. For a particular embodiment, the communications link is supported by a bidirectional Mobile Industry Processor Interface (MIPI). MIPIs support numerous protocols including, but not limited to M-PHY, D-PHY, Display Serial Interface (DSI), MIPI Unified Protocol (UniPro), Low Latency Interface (LLI), SuperSpeed Inter-chip (SSIC), and Camera Serial Interface (CSI), to name a few. MIPI is a chip-to-chip interface that conforms to standards created by the MIPI Alliance Standards Body, which standardizes interfaces for mobile applications.

In addition to being operationally coupled to the primary processor 214, the adjunct processor 216 is also operationally coupled to the input devices 202-212 and 222, enabling the adjunct processor 216 to monitor those devices for input. Input device 202 represents an optical input module, in this case a camera, that allows a device, such as device 102, to capture images in the vicinity of the device 102 and to convert those images to image data that can be processed by the adjunct processor 216. Generally, a device, such as device 102, is designed to capture useful image data in a vicinity of the device, or within a distance for which a user can interact with the device 102. Image data represents the informational content of an image, or a set of images, independent of its encoded format. In a first example, the camera 202 captures an image of a user's face. In a second example, the adjunct processor 216 processes sequentially captured images to determine that an object is moving in the vicinity of the device 102.

One or more acoustic transducers 204, such as the microphones 108 and 110, enable the device 102 to receive acoustic input. For an embodiment, microphones 204 allow a user to interact with the device 102 through speech. The device 102 can accept a set of verbal commands, for example, or be programmed to detect and react to non-verbal sounds. Particular sounds, for instance, can indicate that a user is in proximity to the device 102. In another embodiment, a user's proximity to the device 102 can be detected by one or more proximity sensors 206. The proximity sensors 206 for the device 102 can be active and or passive. For an embodiment, an active proximity sensor determines a proximity or distance to an object by measuring the time it takes for a signal, such as a light signal, transmitted by the device 102 to be detected by the device 102. For another embodiment, a passive proximity sensor detects a signal, such as an infrared or thermal signal, emanating from a user or an electronic signal being transmitted by a separate device carried on the user's person, to determine proximity. In one embodiment, the camera 106 of device 102 is used to perform the function of the proximity sensors 206.

The block element 208 represents one or more motion sensors that allow the device 102 to determine its motion relative to its environment. The motion sensors 208 can include, but are not limited to: accelerometers, velocity sensors, air flow sensors, gyroscopes, and global positioning system (GPS) receivers. Multiple sensors of a common type can also take measurements along different axial directions. For some embodiments, the motion sensors 208 include hardware and software elements that allow the device 102 to triangulate its position using a communications network. In further embodiments, the motion sensors 208 allow the device 102 to determine its position, velocity, acceleration, additional derivatives of position with respect to time, and average quantities associated with the aforementioned values. For a particular embodiment, the device 102 uses one or more motion sensors 208 to determine that it is being shaken.

From the input of one or more touch sensors 210, the device 102 can determine if it is in contact with another object. The device 102 can be placed on a table, for instance, or held in a user's hand. For example, the touch sensor 112 of FIG. 1 is shown on the back of the device 102, where a user is most likely to be holding the device 102. In a particular embodiment, the touch sensors 210 uses capacitive sensors to detect anything contacting the communication device 102 that is conductive or has a dielectric constant different than that of air. In alternate embodiments, the touch sensors 210 utilize pressure sensitive areas or photo sensors to measure the user's contact points with the device 102. Where pressure sensitive areas are used, for example, a change in pressure indicates a portion of a user's body is being pressed against the device 102. For photo sensors, contact by the user with the device 102 blocks the light that the sensors receive.

The adjunct processor 216 can also detect a contact to a touchscreen 212 of the electronic device 102, such as touchscreen 104. The touchscreen 104 provides a means for receiving tactile (or touch) input from a user's finger or some other input device, such as a stylus. In particular embodiments, the touchscreen 104 can operate in accordance with any suitable technology for sensing touch such as, by way of example, a resistive touchscreen or a capacitive touchscreen. The touchscreen 212 is operationally coupled to the adjunct processor 216 using the bus 224, which in an embodiment includes communication interfaces (not shown) for communicating data between the touch screen 212 and the adjunct processor 216.

The touchscreen 104 can also display data, as indicated by the e-mail notification icon 114. For an embodiment, the touchscreen 104 is a liquid crystal display (LCD) that translates electrical signals it receives into a given image. Each pixel of the image 114, for example, can correspond to a capacitor within the touchscreen 104 that is charged and slowly discharged to display the icon 114.

As shown in FIG. 1, the touchscreen 104 is in a sleep mode. A primary portion of the touchscreen 104 is not illuminated, as indicated by the shading at 104. For an embodiment, the limited functionality of the touchscreen 104 while in sleep mode allows it to intermittently display an interactive notification, such as the e-mail notification icon 114. The device 102 receives an e-mail while in a sleep mode. Without powering up the entire touchscreen 104, the device 102 displays a small notification icon in the lower-right portion of the touchscreen 104, as shown at 114, that fades in and out of view for a period of time. This intermittent displaying of an interactive notification icon while the device 102 is in a sleep mode is referred to herein as "breathing." The period of time the icon 114 breaths is sufficient to allow a user to tap (or otherwise make contact with) the touchscreen 104, for instance, at the location of or in a vicinity of the icon 114, to view or "peek" at additional information about the e-mail. When the breathing icon 114 is tapped, the device 102 momentarily displays pre-selected content from the email, including but not limited to the e-mail's subject line and sender, at the location of the icon 114. If the user chooses to do so, he can wake the device 102 from its sleep mode and read the e-mail.

The duration of time the notification icon 114 is displayed on the touchscreen 104 can be measured by the system clock 218, which, for an embodiment, is operationally coupled to both the primary 214 and the adjunct 216 processors. For an embodiment, the system clock 218 provides timecodes that allow the processors 214, 216 to track time. In a further embodiment, the system clock 218 is configured to determine the expiration time and determine the input detection time. The primary processor 214, for example, can query the system clock 218 for timecodes that indicate the time and determine the length of a time interval by determining a time difference between timecodes. Additionally or alternatively, the primary 214 and/or the adjunct 216 processors may have integrated clocks that allow the processors 214, 216 to track time in accordance with the teachings herein. For example, the primary processor 214 includes a first clock configured to determine the expiration time, and the adjunct processor 216 includes a second clock configured to determine the input detection time.

The memory component 220 represents a storage location that is accessible to the adjunct processor. In one embodiment, the memory component 220 represents cache memory integrated with the adjunct processor 216. In another embodiment, the memory component 220 represents a portion of RAM for the device 102. In a further embodiment, the memory component 220 is also accessible to the primary processor 214.

The wireless transceiver 222 allows the device 102 to upload and download data to and from one or more networks, such as a wireless local area network (WLAN) or a cellular network. A WLAN transceiver 222 allows the device 102 direct access to the Internet using standards such as Wi-Fi, which is offered at hotspots. For embodiments where the wireless transceiver 222 is a cellular transceiver, cellular networks can use any wireless technology that, for example, enables broadband and Internet Protocol (IP) communications including, but not limited to, $3^{rd}$ Generation (3G) wireless technologies such as CDMA2000 and Universal Mobile Telecommunications System (UMTS) networks or $4^{th}$ Generation (4G) or pre-4G wireless networks such as LTE and WiMAX.

A power supply (not shown) supplies electric power to the device elements 202-224, as needed, during the course of their normal operation. The power is supplied to meet the individual voltage and load requirements of the device elements 202-224 that draw electric current. The power supply also powers up and powers down the device 102. For a particular embodiment, the power supply includes a rechargeable battery.

Figure 3:
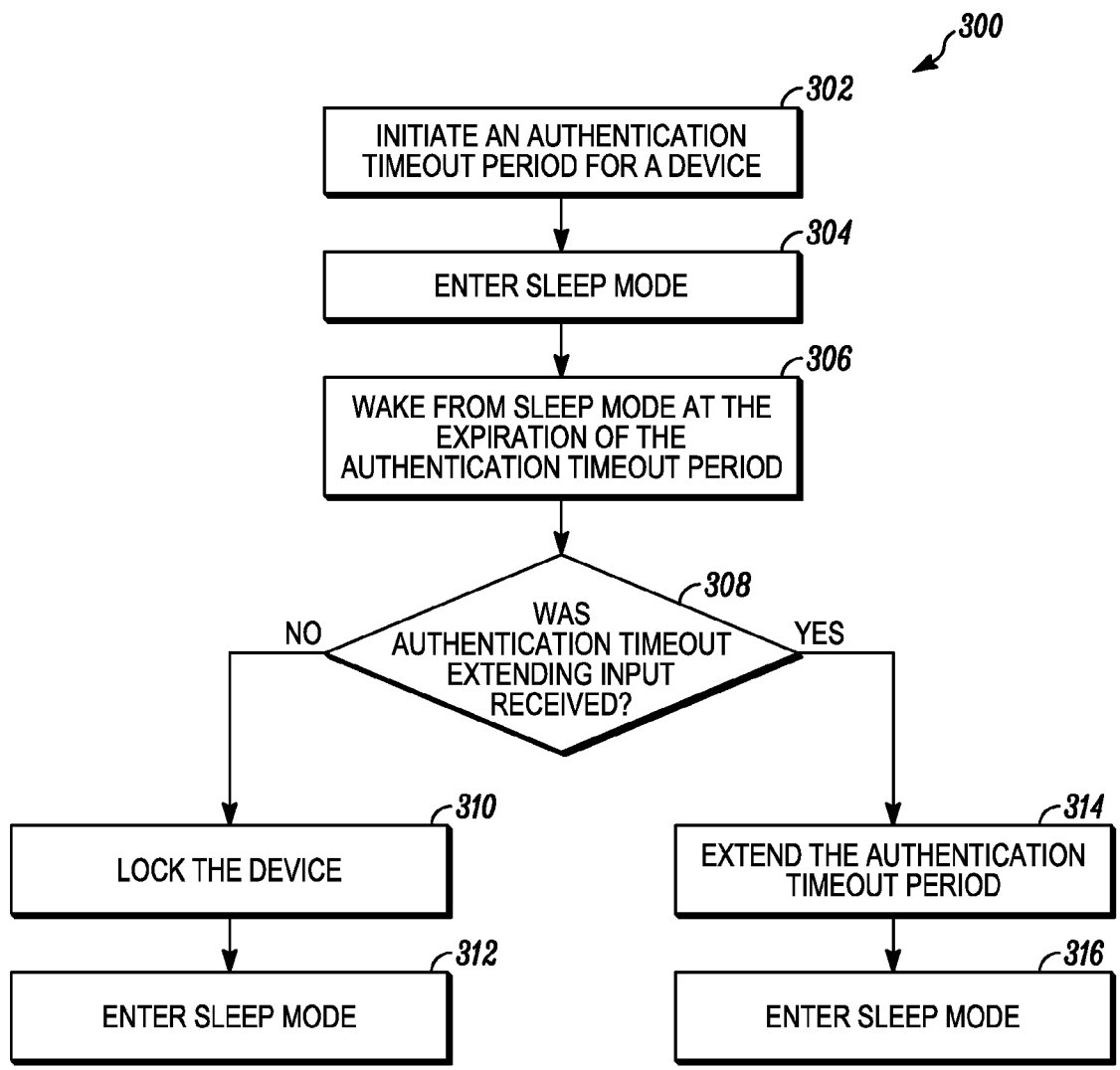
FIG. 3 is a logical flowchart of a method for managing an authentication timeout period in accordance with some embodiments of the present teachings.

We turn now to a detailed description of the functionality of the device 102 and the device elements shown in FIGS. 1 and 2 at 102 and 200, respectively, in accordance with the teachings herein and by reference to the remaining figures. FIG. 3 is a logical flow diagram illustrating a method 300 performed by a primary processor of a device, taken to be the primary processor 214 of device 102 for purposes of this description, for managing an ATP in accordance with some embodiments of the present teachings. Specifically, the primary processor 214 initiates 302 an ATP for the device 102 at a timeout initiation time. For an embodiment, the ATP is a period of time, the length of which is set by a user for instance, that the device 102 (more particularly the primary processor 214) uses to determine whether or not to lock the device 102 contingent on activity or inactivity as relates to the device 102. For other embodiments, the length of the ATP is determined by an algorithm or preprogrammed by an administrator or a manufacturer of the device 102. In an embodiment represented by the method 300, the primary processor 214 enters 304 a sleep mode between the initiation 302 of the ATP for the device 102 and the primary processor 214 waking 306 from the sleep mode at an expiration time (end) of the ATP.

While the primary processor 214 is asleep, the adjunct processor 216 monitors the device 102, specifically its various sensors and components (e.g., 202-212) for an authentication timeout extending input. The accompanying philosophy of use is that if a user intentionally interacts with the device 102 while the primary processor 214 is asleep, then that interaction should be considered in determining whether to extend the ATP before locking the device 102. An authentication timeout extending input is a subset (not necessarily a proper or strict subset) of the input the device is capable of receiving that has the ability to extend the ATP. What type of input qualifies as timeout extending input can be determined by an algorithm or preprogrammed by an administrator or a manufacturer of the device 102.

For a first embodiment, the authentication timeout extending input is generated as a result of a contact to the touchscreen 104 of the electronic device 102 after a notification is displayed on the touchscreen 104. To implement this embodiment, the device 102 includes the touchscreen 104 coupled to the adjunct processor 216, wherein the touchscreen 104 is configured to detect tactile input and responsively provide the authentication timeout extending input to the adjunct processor 216. Contact to the touchscreen 104 may be made with a user's finger or other implement, such as a stylus. When the user sees the breathing e-mail notification icon 114, for example, the user taps on the touchscreen 104 to display more information about the e-mail. In doing so, the touchscreen 104 responsively provides the authentication timeout extending input that the adjunct processor 216 detects.

For a second embodiment, the authentication timeout extending input is generated as a result of a contact to a housing of the electronic device 102. To implement this embodiment, the device 102 includes the at least one touch sensor 210 coupled to the adjunct processor 216, wherein the at least one touch sensor 210 is configured to detect tactile input and responsively provide the authentication timeout extending input to the adjunct processor 216. The touch sensor 112 located on the backside of the device housing, for example, detects a user's hand cradling the device while the user views or interacts with the touchscreen 104 and provides the authentication timeout extending input to the adjunct processor 216. In additional embodiments, touch sensors 210 are placed at different locations on the device 104, such as along the edges of the device 102 to detect an alternate grip that "pinches" the device 102 between the user's thumb and fingers and, responsively, provide the authentication timeout extending input to the adjunct processor 216.

For a third embodiment, the authentication timeout extending input is generated as a result of shaking the electronic device 102. To implement this embodiment, the device 102 includes the at least one motion sensor 208 coupled to the adjunct processor 216, wherein the at least one motion sensor 208 is configured to detect a motion of the device 102 and responsively provide the authentication timeout extending input to the adjunct processor 216. To display the time or solicit more information about a breathing notification while the device 102 is asleep, for instance, a user shakes the device 102 in a way to cause detection by one or more motion sensors 208, which responsively provide the authentication timeout extending input to the adjunct processor 216. To distinguish a user's intentional shaking from environmental vibration, the user might "twist" or "roll" the device 102 back and forth about a pivot point by supinating his forearm. Alternatively, the user can "wave" the device back and forth, or trace a geometric pattern, through a distance larger than that associated with environmental vibration.

For a fourth embodiment, the authentication timeout extending input is generated as a result of an object being in proximity to the electronic device 102. To implement this embodiment, the device 102 includes the at least one proximity sensor 206 coupled to the adjunct processor 216, wherein the at least one proximity sensor 206 is configured to detect proximity of an object to the device 102 and responsively provide the authentication timeout extending input to the adjunct processor 216. The proximity sensors 206, for example, might detect that a user, who stopped interacting with the device 102, remains in proximity to the device 102 and, responsively, provide the authentication timeout extending input to the adjunct processor 216. Alternatively, the motion sensors 206 might detect an approach by the user, such as when the user walks into his office, where the device 102 is located and, responsively, provide the authentication timeout extending input to the adjunct processor 216. In a specific case, proximity of the user might not constitute an authentication timeout extending input until or unless the user is within a threshold distance of the device 102. In a further example, a separate device located on the user's person identifies the user to the device 102.

For a fifth embodiment, the authentication timeout extending input is generated as a result of a gesture directed to the electronic device 102. A user can communicate his intent to interact with the device 102 by gesturing to the device 102. Rather than shaking or tapping the device, for example, the user waves his hand in front of the camera 106. The device then compares sequentially captured images to determine the hand's motion. In another case, the device 102 compares a captured image of the user's hand to stored images of specific gestures to determine if the user is gesturing in a recognizable way, showing his intent to interact with the device 102. The adjunct processor 216 treats recognized gestures as authentication timeout extending input.

For a sixth embodiment, the authentication timeout extending input is generated as a result of speech input into the electronic device 102. To implement this embodiment, the device 102 includes at least one acoustic transducer (e.g., microphones 108, 110) coupled to the adjunct processor 216, wherein the at least one acoustic transducer 108, 110 is configured to detect audio input and responsively provide the authentication timeout extending input to the adjunct processor 216. For example, the adjunct processor 216 might recognize particular verbal commands or the specific speech pattern of a user as authentication timeout extending input. A speech processing module (not shown), for example, can analyze phonemes, the phonetic building blocks of speech, captured by the microphones 108, 110. The device 102 compares the captured phonemes against phonemes stored in a database and calculates a confidence score that the captured phonemes represent a command or a user's speech pattern. When the confidence score exceeds a threshold score, the adjunct processor stores a timestamp to a location in the memory component 220 for the captured speech, which is identified as authentication timeout extending input.

In different embodiments, the device 102 uses different means to determine whether a user is interacting with the device 102 and whether the user is interacting with the device 102 in an intentional way or unintentionally. For example, motion that the device 102 experiences while being carried in a handbag or contact with another item in the handbag are not events that constitute intentional user interaction. Further, the user speaking directly to another person, rather than to the device 102, or the user making momentary contact with the touchscreen 104 of the device 102 are not events that constitute intentional interaction with the device 102. An event, as used herein, is an occurrence that is detectable by the device 102 that may or may not be authentication timeout extending input.

In one embodiment, the adjunct processor 216 detects an event as an authentication timeout extending input only when the duration of an event exceeds a threshold time interval, which can, for instance, be set by the user or another programmer of the device 102. For example, a contact to the touchscreen 104 of the device 102, a contact to the housing of the device 102, a shaking of the device 102, or a gesture directed to the device 102 are events that are only determined to be authentication timeout extending input if they are sustained for a time period long enough to indicate that the user has intent to interact with the device 102.

In another embodiment, the adjunct processor 216 determines that user input that is repeated is authentication timeout extending input. For example, the user taps the touchscreen 104 not once but twice in succession or the user shakes the device back and forth numerous times to communicate intent to interact with the device 102.

When the adjunct processor 216 detects device input that qualifies as timeout extending input, the adjunct processor 216 uses an integrated clock or the system clock 218 to associate a timestamp with the input. The timestamp, which indicates the input detection time of when the adjunct processor 216 detected the timeout extending input, is stored in the memory component 220 of the device 102, which in different embodiments can be a cache memory of the adjunct processor 216 and/or a separate memory component that is accessible to both the adjunct processor 216 and the primary processor 214.

The primary processor wakes 306 at the expiration time of the ATP to determine if the device 102 should be locked, or alternatively, if the ATP should be extended. Which of the two actions the primary processor 214 takes is based upon whether the adjunct processor 216 detected one or more authentication timeout extending inputs while the primary processor 214 was sleeping. The primary processor 214 queries the adjunct processor 216 over a communication link between the two processors 214, 216 to determine 308 if an authentication timeout extending input was received by the adjunct processor 216 during the ATP. Alternatively, the primary processor 214 checks for one or more timestamps stored in a predetermined location of the memory component 220 for an indication that the adjunct processor 216 received one or more corresponding authentication timeout extending inputs. For this embodiment, the device includes the memory component 220 coupled to the adjunct processor 216 and the primary processor 214, wherein the memory component 220 is configured to store a timestamp that indicates the input detection time.

If no authentication timeout extending input was received, then the primary processor locks 310 the device 102 and returns 312 to sleep mode until a user wakes the device 102 and performs an authentication procedure. Alternatively, if an authentication timeout extending input was received during the ATP, then the primary processor extends 314 the ATP and returns 316 to sleep mode until the extended ATP expires.

Figure 4:
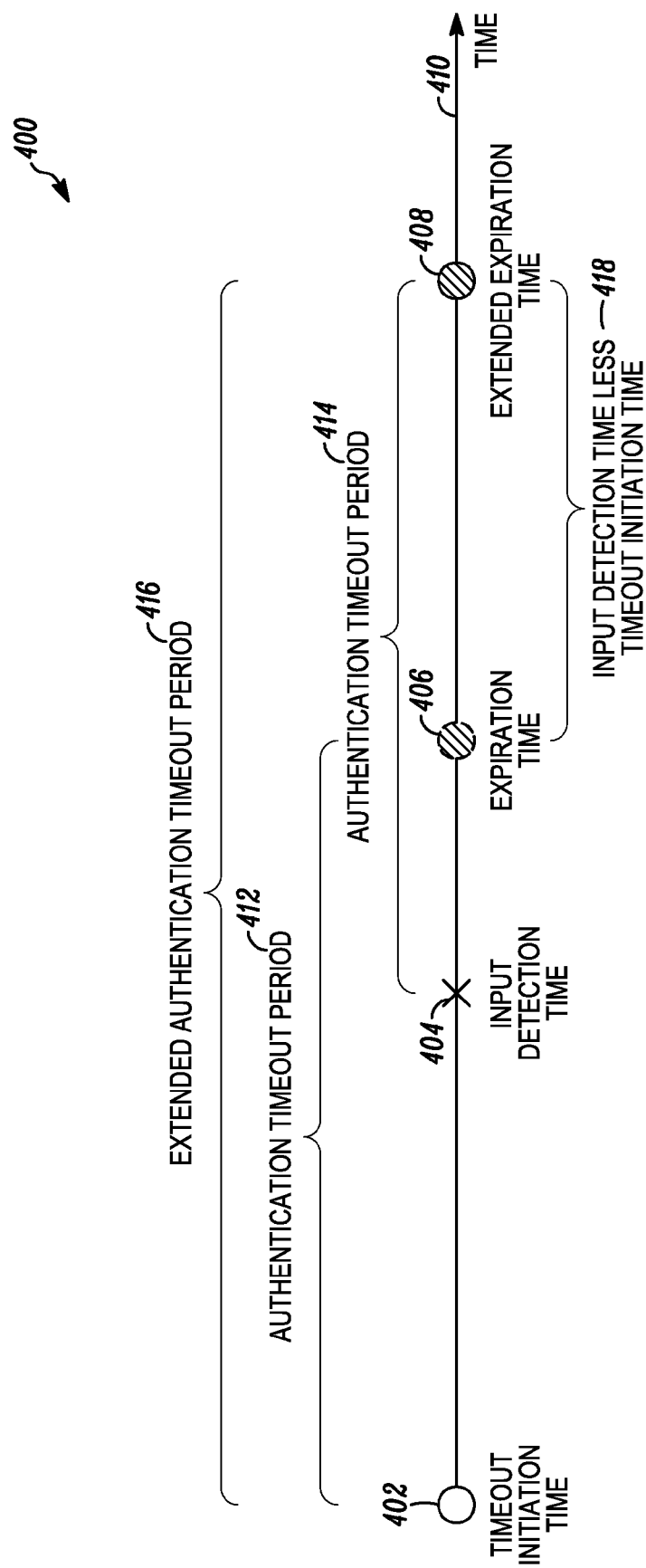
FIG. 4 is a schematic diagram of an extended authentication timeout period in accordance with some embodiments of the present teachings.

For a particular embodiment, the primary processor 214 extends 314 the ATP to expire at an extended expiration time of the expiration time plus the input detection time less the timeout initiation time. This embodiment is described in greater detail with reference to FIG. 4. Shown in FIG. 4 at 400 is a schematic diagram that graphically illustrates the extension of the ATP. Specifically, diagram 400 includes a time axis 410, with increasing time directed to the right, upon which four points in time are indicated at 402-408. Point 402 represents the timeout initiation time, which is the time the primary processor 214 initiates an ATP 412. The ATP 412 ends at an expiration time indicated at 406. Indicated at 404 is an input detection time, which is the time at which an authentication timeout extending input was detected by the adjunct processor 216.

Upon waking at the expiration time 406 and determining that authentication timeout extending input was detected by the adjunct processor 216 at the input detection time 404, the primary processor 214 extends the ATP 412 as shown at 416 to expire at an extended expiration time 408. In one particular embodiment, the primary processor 214 extends the ATP 412 such that an extended ATP 416 expires at a time interval after the input detection time 404 that is equal to the ATP 412, as shown at 414. Equivalently, the primary processor 214 extends the ATP 412 at the expiration time 406 by an amount of time equal to the input detection time 404 less the timeout initiation time 402, as indicated at 418.

In an embodiment in which the adjunct processor 216 detects multiple authentication timeout extending inputs during the ATP 412, the primary processor 214 uses the timestamp of the last authentication timeout extending input detected as the input detection time 404. The primary processor 214 then extends the ATP 412 based on that input detection time 404 alone. In an alternate embodiment, the primary processor 214 sets the extended expiration time 408 based on a number of input detection times of multiple authentication timeout extending inputs detected during the ATP 412. For example, the primary processor 214 can extend the ATP 412 by 5 minutes for each authentication timeout extending input detected by the adjunct processor 214. In a further embodiment, the primary processor 214 extends the ATP 412 by a fixed amount of time (e.g., 20 minutes) independent of how many timeout extending inputs were detected, as long as at least one authentication timeout extending input detected by the adjunct processor 214 during the ATP 412.

In another embodiment, the extended expiration time 408 is further based on a type of authentication timeout extending input received. A user checking the time, for instance, while the primary processor 214 is asleep might result in a shorter ATP extension than if the user had tapped on a notification icon. In the case of multiple authentication timeout extending inputs, the primary processor 214 might set the extended expiration time 408 as a function of the number and types of input, $f(x_1, x_2, x_2)$, where $x_1$, $x_2$, and $x_3$ represent inputs of a first, second, and third type, respectively. For example, the primary processor might extend the ATP 412 by 3 minutes for each first-type input received, by 5 minutes for each second-type input received, and by 10 minutes for each third-type input received.

Under the paradigm for extending the ATP 412 illustrated in diagram 400, the extended expiration time 408 falls beyond the expiration time 406 by the same amount of time as the input detection time 404 falls beyond the timeout initiation time 402. If, for example, the only authentication timeout extending input to occur during the ATP 412 happened one minute after the timeout initiation time 402, then the ATP would only be extended by one minute. Because waking the primary processor 214 again after only a one-minute interval is an inefficient use of resources, and further because little is likely to change in a minute, the primary processor 214 locks the electronic device 102 when no authentication timeout extending input was detected beyond a threshold time interval of the timeout initiation time 402. For an embodiment, when an authentication timeout extending input is detected, the primary processor 214 extends the ATP 412 to expire at the extended expiration time 408 when the input detection time 404 is outside of (i.e., beyond) a threshold time interval of the timeout initiation time 402. When the input detection time 404 is within the threshold time interval of the timeout initiation time 403, the primary processor locks the device 102. The threshold time interval can be set to 30 seconds, a minute, or any other time interval a user, administrator, or manufacturer chooses.

In a further embodiment, the paradigm for extending the ATP 412 illustrated in diagram 400 can be repeated so that the primary processor 214 applies a second extension to the ATP 412, or equivalently, applies a first extension to the extended ATP 416. Specifically, after the primary processor 214 extends 314 the ATP 412 and returns 316 to sleep, the primary processor 214 again wakes from sleep mode, as it did at 306, but this time at the extended expiration time 408. The primary processor 214 then determines whether a subsequent authentication timeout extending input was detected by the adjunct processor 216 at a subsequent input detection time (not shown) that occurred after the expiration time 406.

If a subsequent authentication timeout extending input was not detected by the adjunct processor 214, the primary processor 214 locks the device 102 and returns to sleep mode. If, however, a subsequent authentication timeout extending input was detected by the adjunct processor 216 between the expiration time 406 and the extend expiration time 408 at a subsequent input detection time (not shown), then the primary processor 214 extends the extended ATP 416 by a time interval equal to the subsequent input detection time less the first input detection time 404. After extending the extend ATP 416, the primary device 214 again returns to sleep mode until the expiration of the twice-extended ATP (not shown). Continuing the method of diagram 400, the primary processor 214 may repeatedly extend the ATP 412 as long as the adjunct processor 216 repeatedly detects additional authentication timeout extending inputs that occur between the previous two expiration times.

For one embodiment, the primary processor 214 postpones locking the device 102 if the device 102 is in the presence of a wireless access point. A wireless access point, as used herein, is a physical device that allows another device, such as device 102, to establish a wireless connection to a wired or wireless network. The device 102 is in the presence of a wireless access point when it is close enough to the wireless access point to establish a connection to the wired or wireless network (e.g., the device 102 being located within a Wi-Fi hotspot). For a particular embodiment, the device 102 is in the presence of the wireless access point when a signal strength associated with the wireless access point is above a threshold signal strength. If, for example, the adjunct processor 216 does not detect an authentication timeout extending input between the timeout initiation time 402 and the expiration time 406, or if it does not detect subsequent authentication timeout extending input between the expiration time 406 and the extended expiration time 408, then the primary processor 214 does not lock the device 102 at the expiration time 406, or at the extended expiration time 408, respectively, while the device 102 is in the presence of a wireless access point.

In a first embodiment, the detected presence of a wireless access point is treated as authentication timeout extending input and the primary processor 214 extends the ATP 412 accordingly and returns to sleep mode. In a second embodiment, the primary processor 214 remains awake and locks the device 102 immediately after detecting that the device 102 is no longer in the presence of the wireless access point, unless an authentication timeout extending input was received within the last time period by which the ATP 412 was extended. For a particular embodiment, the device 102 remains unlocked in the presence of a wireless access point only when the wireless access point is a trusted wireless access point. In one embodiment, a trusted wireless access point is a wireless access point a user of device 102 has indicated to the device 102 he trusts. In another embodiment, a trusted wireless access point is a wireless access point on a list of trusted wireless access points compiled by some authority (e.g., Norton, McAfee) that is stored either locally on device 102 or accessible to device 102 via the wireless access point and the wireless transceiver 222.

Figure 5:
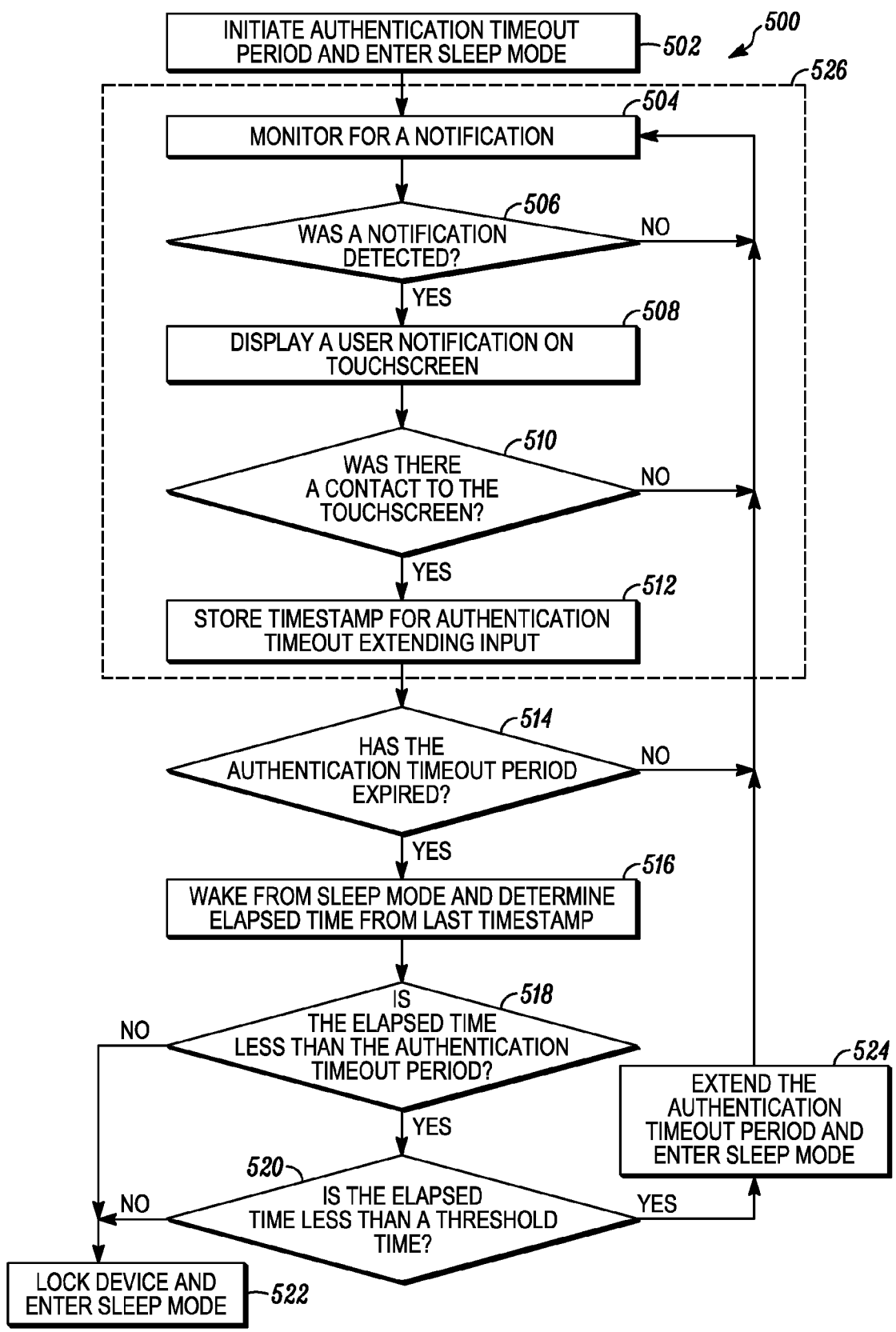
FIG. 5 is a logical flowchart of a method for managing an authentication timeout period in accordance with some embodiments of the present teachings.

FIG. 5 is a logical flowchart of a method 500 for managing an ATP, such as the ATP 412, that, in contrast to FIG. 3, shows actions performed by both the primary processor 214 and the adjunct processor 216. In a particular embodiment, the actions of the adjunct processor 216 are indicated within a dashed box 526. Whereas, the remaining actions shown in FIG. 5 are performed by the primary processor 214. Specifically, the method 500 includes the primary processor 214 initiating 502 the ATP 412 and entering 502 a sleep mode. While the primary processor 214 is sleeping, the adjunct processor 216 monitors 504 for notifications. Notifications are messages that the adjunct processor 216 receives from other elements within the device 102 that indicate the status of the device 102 has changed in a way that warrants a user notification. If the adjunct processor 216 detects 506 a notification, it instructs the device 102 to display 508 a user notification on the touchscreen 104. For a particular embodiment, the adjunct processor 216 receives a notification of an incoming e-mail and instructs the device 102 to display the breathing e-mail notification icon 114 on the touchscreen 104. If the adjunct processor 216 does not detect 506 a notification, it continues to monitor 504 for one.

After the user notification is displayed, the adjunct processor 216 determines 510 if a user makes contact with the touchscreen 104. If the user does make contact with the touchscreen 104, the adjunct processor 216 detects the contact as an authentication timeout extending input and stores 512 a timestamp for the input. If the user does make contact with the touchscreen 104, the adjunct processor 216 again monitors 504 for other notifications. The adjunct processor 216 continues to monitor 504 for notifications until the ATP 412 expires 514.

When the ATP 412 expires 514, the primary processor 214 wakes 516 and determines 516, for instance by querying the adjunct processor 216 or performing a calculation based on the stored timestamp, the elapsed time from the last authentication timeout extending input as calculated from the timestamp for that input. If the primary processor 214 determines 518 the elapsed time is greater than the ATP 412, then no authentication timeout extending input was detected by the adjunct Processor 216 during the ATP 412, and the primary processor 214 locks 522 the device 102 and enters 522 sleep mode.

If the primary processor 214 determines 518 the elapsed time is less than the ATP 412, the primary processor 214 then determines 520 if the elapsed time is less than a threshold time. The elapsed time being less than a threshold time indicates that the last authentication timeout extending input did not occur just after the timeout initiation time 402. In that case, the primary processor 214 extends 524 the ATP 412, as indicated in the diagram 400, and returns 524 to sleep mode as the adjunct processor 216 continues to monitor 504 for notifications. If the elapsed time is greater than the threshold time, while still being less than the ATP 412, then the last authentication timeout extending input occurred just after (within a threshold of) the timeout initiation time 402. In that case, the primary processor 214 locks 522 the device 102 and enters 522 sleep mode rather than extending the ATP 412 by only a very short duration.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may include of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., including a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a primary processor of an electronic device for extending an authentication timeout period for the electronic device, the method comprising:
    initiating an authentication timeout period at a timeout initiation time;
    putting the primary processor into a sleep mode;
    awakening the primary processor from the sleep mode at an expiration time, upon expiration of the authentication timeout period, and determining whether an authentication timeout extending input was detected by an adjunct processor of the electronic device at an input detection time that occurred during the authentication timeout period; and
    extending the authentication timeout period to expire at an extended expiration time, which is based on the input detection time, when the authentication timeout extending input was detected by the adjunct processor or locking the electronic device when the authentication timeout extending input was not detected by the adjunct processor.

2. The method of claim 1, wherein the extended expiration time is further based on a number of authentication timeout extending inputs detected during the authentication timeout period.

3. The method of claim 1, wherein the extended expiration time is further based on a type of authentication timeout extending input received.

4. The method of claim 1, wherein the extended expiration time is the expiration time plus the input detection time less the timeout initiation time.

5. The method of claim 1 further comprising returning the primary processor to the sleep mode after extending the authentication timeout period.

6. The method of claim 5 further comprising;
    awakening the primary processor from the sleep mode at the extended expiration time and determining whether a subsequent authentication timeout extending input was detected by the adjunct processor at a subsequent input detection time that occurred after the expiration time; and
    extending the extended authentication timeout period by a time interval comprising the subsequent input detection time less the first input detection time and returning the primary processor to the sleep mode when the subsequent authentication timeout extending input was detected by the adjunct processor or locking the electronic device and returning the primary processor to the sleep mode when the subsequent authentication timeout extending input was not detected by the adjunct processor.

7. The method of claim 1, wherein the authentication timeout extending input is generated as a result of an event comprising at least one of:
    a contact to a touchscreen of the electronic device;
    a contact to a housing of the electronic device;
    a shaking of the electronic device;
    an object being in proximity to the electronic device;
    a gesture directed to the electronic device; or
    speech input into the electronic device.

8. The method of claim 7, wherein the authentication timeout extending input is detected by the adjunct processor when a duration of the event exceeds a threshold time interval.

9. The method of claim 1, wherein when the authentication timeout extending input was detected, the method further comprising:
    extending the authentication timeout period to expire at the extended expiration time when the input detection time is outside of a threshold time interval of the timeout initiation time; or
    locking the electronic device when the input detection time is within the threshold time interval of the timeout initiation time.

10. The method of claim 1, wherein locking the electronic device is postponed while the electronic device is in the presence of a wireless access point.

11. The method of claim 10, wherein locking the electronic device is postponed when the wireless access point is a trusted wireless access point.

12. The method of claim 1, wherein the authentication timeout extending input is generated as a result of a contact to a touchscreen of the electronic device after a notification is displayed on the touchscreen.

13. An electronic device configured to extend an authentication timeout period for the electronic device, the electronic device comprising:
    an adjunct processor configured to detect, while a primary processor is in a sleep mode, an authentication timeout extending input occurring at an input detection time during an authentication timeout period initiated at a timeout initiation time; and
    the primary processor coupled to the adjunct processor and configured to:
        awaken from the sleep mode upon expiration of the authentication timeout period at an expiration time, and determine that the authentication timeout extending input was detected by the adjunct processor during the authentication timeout period; and
        extend the authentication timeout period to expire at an extended expiration time, which is based on the input detection time.

14. The electronic device of claim 13, wherein the extended expiration time is the expiration time plus input detection time less the timeout initiation time.

15. The electronic device of claim 13 further comprising a touchscreen coupled to the adjunct processor, wherein the touchscreen is configured to detect tactile input and responsively provide the authentication timeout extending input to the adjunct processor.

16. The electronic device of claim 13 further comprising at least one touch sensor coupled to the adjunct processor, wherein the at least one touch sensor is configured to detect tactile input and responsively provide the authentication timeout extending input to the adjunct processor.

17. The electronic device of claim 13 further comprising at least one proximity sensor coupled to the adjunct processor, wherein the at least one proximity sensor is configured to detect proximity of an object to the electronic device and responsively provide the authentication timeout extending input to the adjunct processor.

18. The electronic device of claim 13 further comprising at least one acoustic transducer coupled to the adjunct processor, wherein the at least one acoustic transducer is configured to detect audio input and responsively provide the authentication timeout extending input to the adjunct processor.

19. The electronic device of claim 13 further comprising at least one motion sensor coupled to the adjunct processor, wherein the at least one motion sensor is configured to detect a motion of the device and responsively provide the authentication timeout extending input to the adjunct processor.

20. The electronic device of claim 13, wherein the electronic device further comprises a memory component coupled to the adjunct processor and the primary processor, wherein the memory component is configured to store a timestamp that indicates the input detection time.

* * * * *